Jan. 7, 1941.   C. WALKER   2,227,772
CULTIVATOR
Filed Jan. 30, 1939   2 Sheets-Sheet 1

Inventor
CARTER WALKER
By
Edward V. Hardway
Attorney

Jan. 7, 1941.   C. WALKER   2,227,772
CULTIVATOR
Filed Jan. 30, 1939   2 Sheets-Sheet 2

Inventor
CARTER WALKER

By
Edward V. Hardway
Attorney

Patented Jan. 7, 1941

2,227,772

UNITED STATES PATENT OFFICE 2,227,772

CULTIVATOR

Carter Walker, Eagle Lake, Tex.

Application January 30, 1939, Serial No. 253,480

5 Claims. (Cl. 97—179)

This invention relates to a cultivator.

An object of the invention is to provide in a cultivator, or other agricultural implement, novel means for pulverizing the ground near, and on opposite sides of, the row of plants without injury to, or danger of covering, the plants.

The invention embodies, in a cultivator, adjacent gangs of radial blades, the blades of each gang being staggered, all mounted to revolve as a unit.

Another object of the invention is to provide in a cultivator, a novel type of shank on which each of said units is mounted to rotate and by means of which it is suspended from the corresponding beam so that the gangs of blades may be adjusted in any selected angular relation with respect to the row.

With the above and other objects in view, the invention has particular relation to certain novel features of construction, operation and arrangement of parts, an example of which is given in this specification and illustrated in the accompanying drawings, wherein:—

Figures 1, 2:
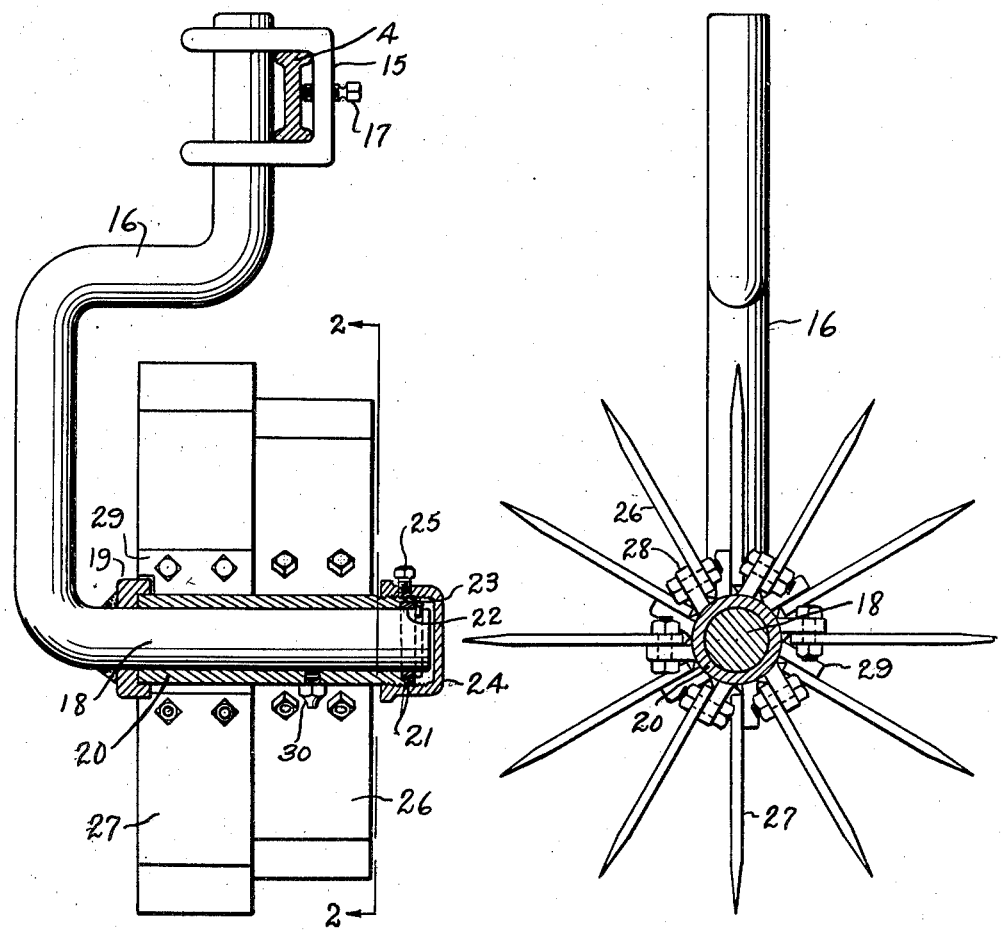
Figure 1 shows a sectional view of a shank on which the blades, constituting a unit, are mounted to rotate.
Figure 2 shows a sectional view on the line 2—2 of Figure 1.
Figure 3:
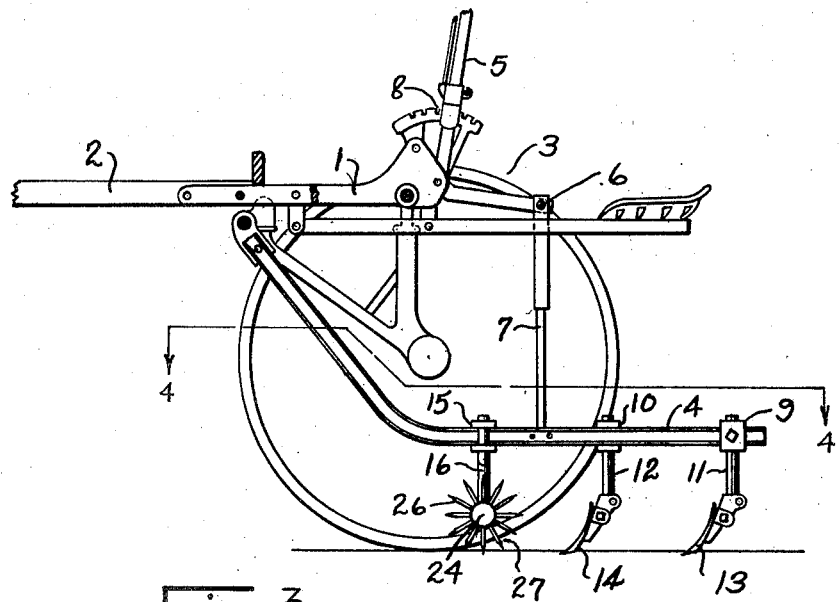
Figure 3 shows a longitudinal, sectional view of a cultivator embodying the invention.

Referring now more particularly to the drawings wherein like numerals of reference designate the same parts in each of the figures, the numeral 1 designates the framework of the cultivator as a whole, having the draft bar 2. The frame is mounted on the usual carrier wheels 3. There are the side beams as 4, 4 whose forward ends are pivoted to the frame to permit vertical movement of the beams. The beams may be adjustable vertically by means of the lever 5 whose lower end is rearwardly extended and connected to the transverse lift rod 6 which, in turn, is connected to the vertical lift bars as 7, whose lower ends are connected to the respective beams 4. The lever 5 may be held at any point of adjustment through the usual rack-and-dog arrangement 8. On the side beams 4 are the rear brackets 9, 9 and the intermediate brackets 10, 10, by means of which the respective shanks 11, 11 and 12, 12 are secured to the beams. To the lower ends of the shanks 11 and 12 the shovels 13, 13 and 14, 14 are secured. The shovels 13 and 14 are spaced a sufficient distance apart to run along between the rows so as to thoroughly cultivate the soil but not to cover the plants with the earth.

There are the front brackets 15, 15 clamped on the beams but located nearer together than the brackets 10. The upper ends of the shanks 16 extend upwardly through the brackets 15, as shown more clearly in Figure 1, and are held in clamped relation with the brackets 15 by means of the clamp screws 17 threaded through the cross bars of the clamps 15 and which engage against the beams 4 as illustrated in Figure 1. The shanks 11, 12 are secured in their respective brackets in a manner similar to that illustrated in Figure 1.

Figure 4:
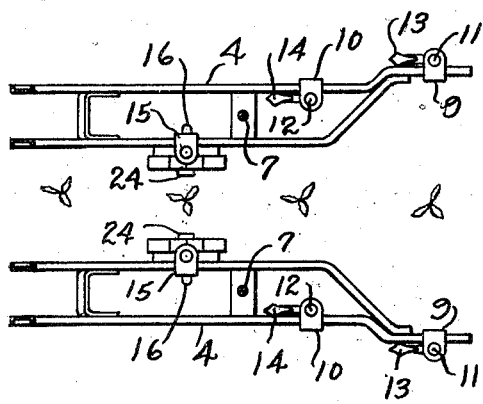
Figure 4 shows a fragmentary, plan view.

The lower ends of the shanks 16 are formed with inwardly directed spindles 18 which are in transverse alignment as indicated in Figure 4. Secured on the outer ends of the spindles are the ferrules as 19 which may be secured thereon in any preferred manner as by welding. Rotatably mounted on the spindles are the sleeves as 20 forming hubs. The outer ends of the hubs 20 are countersunk into the ferrules, as shown in Figure 1, and the inner ends of the hubs have the inside, annular grooves 21 to receive the washers 22. The hubs are retained against detachment from the spindles by means of the cross-keys 23 through the outer end thereof and whose ends engage and retain the washers in place. Screwed onto the inner ends of the hubs are the closure caps 24 which may be secured against detachment by the set bolts 25.

On each hub are two series of radial blades, the blades of one series being indicated by the numeral 26 and the blades of the other series being indicated by the numeral 27. These blades terminate, at their outer ends, in sharp edges approximately parallel with the axis of the corresponding spindle. The blades 26 are staggered with respect to the blades 27. Each hub 20 is provided with the series of lugs 28, 29, the lugs of one series being staggered with respect to the lugs of the other series as more accurately shown in Figures 1 and 2 and the blades 26, 27 may be bolted to the corresponding lugs 28, 29, as shown.

In use the gangs of blades 26, 27 will be arranged to travel on opposite sides of the row, as shown in Figure 4, close to the plants and will cultivate the earth along adjacent the row and destroy the weeds and grass without danger of covering up small plants while the shovels 13, 14 will plow up and cultivate the earth between the rows and more distant from the plants. It is to be understood that the rotatable gangs of blades, however, may be substituted for the shovels 13, 14, if desired, or may be mounted wherever desired on the beams. In practice, however, they will usually be located, as shown, to travel along in close proximity to the row one on each side.

Figure 5:
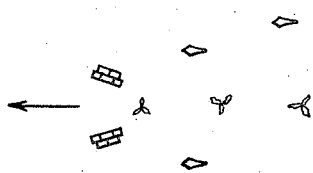
Figure 5 shows a diagrammatic view.

It is to be observed that the shanks 16 may be adjusted in their brackets 15 so that the spindles 18 will converge forwardly thus causing the gangs of blades to diverge forwardly as shown in Figure 5. This will have a tendency to throw the loose earth dug up by the blades 26, 27 rearwardly from them and closely around the plants.

Each hub 20 may, if desired, be provided with a grease gun connection 30 through which a lubricant may be supplied to the corresponding spindle.

The drawings and description disclose what is now considered to be a preferred form of the invention by way of illustration only, while the broad principle of the invention will be described by the appended claims.

What I claim is:

1. In a cultivator, a shank having a spindle, a hub rotatable on the spindle, series of thin radial lugs on the hub, the lugs of one series being staggered with respect to the lugs of the other series, and rigid radial blades detachably secured by bolts to the lugs, and whose outer ends terminate in straight cutting edges which are substantially parallel to the axis of the hub.

2. In a ground working implement, a shank having a spindle, a hub rotatable on the spindle, series of radial lugs on the hub, the lugs of one series being staggered with respect to the lugs of the other series, and series of rigid radial blades detachably secured to the lugs whose inner margins are closely adjacent and whose outer ends terminate in approximately straight cutting edges which are substantially parallel with the axis of the hub, there being more than five blades in each series whereby the blades will loosen and chop the ground into small pieces as the implement is moved over the ground.

3. In a ground working implement, a shank having a spindle, an annular ferrule mounted on the spindle and secured thereto and having an inside, annular groove, a hub rotatable on the shaft and fitted into said groove at one end, the spindle having a bore therethrough near the other end of the hub, a washer countersunk into the end of the hub, a key in the bore which cooperates with the washer and ferrule to prevent longitudinal movement of the hub on the spindle, a closure cap threaded on the hub, series of thin radial lugs welded on the hub, the lugs of one series being staggered with respect to the lugs of the other series, and radial blades detachably secured to the lugs by bolts and terminating in straight cutting edges parallel to the axis of the hub.

4. A cultivator comprising a frame, carriers on which the frame is mounted, shanks depending from the frame and terminating in horizontally disposed spindles spaced apart to move on opposite sides of a row to be cultivated, hubs rotatable on the spindles, radial blades on the hubs which terminate in approximately straight cutting edges which are approximately parallel to the axis of the hub, said shanks being adjustable to vary the angular relation of the spindles whereby said spindles, and the cutters thereon, may diverge forwardly, or rearwardly with respect to said row.

5. In a cultivator a shank having a vertical portion adapted to be clamped to a cultivator frame, said shank having an offset portion and terminating at its lower end in a spindle which extends approximately horizontal, said shank being turnable about an approximately vertical axis whereby the spindle may be varied with relation to the line of travel of the cultivator, a hub rotatable on the spindle, two series of rigid, radial blades fastened to the hub and the blades of one series being staggered with respect to the blades of the other series, said blades terminating in approximately straight cutting edges which are substantially parallel with the axis of the hub, the total width of the two series being approximately the same as the total length of the hub.

CARTER WALKER.